(12) United States Patent
Sakai et al.

(10) Patent No.: US 6,169,316 B1
(45) Date of Patent: Jan. 2, 2001

(54) SEMICONDUCTOR PRESSURE SENSOR INCLUDING SENSOR CHIP FIXED TO PACKAGE BY ADHESIVE

(75) Inventors: Minekazu Sakai, Kariya; Yasutoshi Suzuki, Okazaki, both of (JP)

(73) Assignee: Denso Corporation, Kariya (JP)

( * ) Notice: Under 35 U.S.C. 154(b), the term of this patent shall be extended for 0 days.

(21) Appl. No.: 09/287,012

(22) Filed: Apr. 6, 1999

(30) Foreign Application Priority Data

Apr. 6, 1998 (JP) .................................................. 10-093260

(51) Int. Cl.⁷ .................................................. H01L 29/82
(52) U.S. Cl. .......................... 257/419; 257/783; 257/417
(58) Field of Search .................................. 257/420, 469, 257/633, 419, 418, 782, 783, 417

(56) References Cited

U.S. PATENT DOCUMENTS

| | | |
|---|---|---|
| 5,604,363 | * 2/1997 | Ichihashi . |
| 5,721,446 | * 2/1998 | Kobayashi . |
| 5,828,116 | * 10/1998 | Ao .......................................... 257/417 |
| 5,891,759 | * 4/1999 | Otsuki ................................... 438/122 |
| 5,948,991 | * 9/1999 | Nomura et al. ......................... 73/727 |

FOREIGN PATENT DOCUMENTS

| | | |
|---|---|---|
| 1-301180 | 12/1989 | (JP) . |
| 6-120527 | 4/1994 | (JP) . |
| 8-240498 | 9/1996 | (JP) . |
| 410332505 | * 12/1998 | (JP) . |
| 411023396 | * 1/1999 | (JP) . |

* cited by examiner

Primary Examiner—Sheila V. Clark
(74) Attorney, Agent, or Firm—Pillsbury Madison & Sutro LLP

(57) ABSTRACT

In a semiconductor pressure sensor, adhesive having a Young's modulus of equal to or less than $1\times10^4$ Pa such as silicone system gel is disposed between a bottom wall of a casing and a bottom wall of a sensor chip, and a space between side walls of the sensor chip and side walls of the casing is filled with adhesive having a Young's modulus of equal to or larger than $1\times10^4$ Pa, such as silicone system adhesive or epoxy system adhesive. Accordingly, temperature characteristics of the sensor chip can be improved without causing pressure leakage.

18 Claims, 4 Drawing Sheets

US 6,169,316 B1

SEMICONDUCTOR PRESSURE SENSOR INCLUDING SENSOR CHIP FIXED TO PACKAGE BY ADHESIVE

CROSS REFERENCE TO RELATED APPLICATION

This application is based upon and claims the benefit of Japanese Patent Application No. 10-93260, filed on Apr. 6, 1998, the contents of which are incorporated herein by reference.

BACKGROUND OF THE INVENTION

1. Field of the Invention

This invention relates to a semiconductor pressure sensor including a sensor chip fixed to a package by adhesive.

2. Description of the Related Art

Conventionally, a semiconductor pressure sensor includes a sensor chip fixed to a package by adhesive. In this constitution, when the adhesive is composed of silicone adhesive or epoxy adhesive, stream is produced by a difference in thermal expansion coefficient between the sensor chip and the package to deteriorate temperature characteristics of the sensor chip.

To solve this problem, JP-A-6-120527 proposes adhesive such as silicone system gel, which has flexibility after adhered, for fixing the sensor chip not to deteriorate the temperature characteristics of the sensor chip; however, in this case, pressure leakage is liable to occur.

SUMMARY OF THE INVENTION

The present invention has been made in view of the above problem. An object of the present invention is to provide a semiconductor pressure sensor that includes a sensor chip fixedly accomodated in a package to have desirable temperature characteristics of the sensor chip and not to cause pressure leakage.

According to the present invention, a semiconductor chip is fixed to an inside bottom wall of a package to define a specific space between a side wall thereof and a side wall of the package, and a first adhesive having a first Young's modulus of equal to or less than $1 \times 10^4$ Pa is disposed between the semiconductor chip and the inside bottom wall of the package. Further, a second adhesive having a second Young's modulus of equal to or larger than $1 \times 10^6$ Pa is disposed in the specific space to contact the semiconductor chip and the package.

As a result, temperature characteristics of the semiconductor chip is improved by the first adhesive, and simultaneously, sealing property between the semiconductor chip and the package is improved by the second adhesive. Therefore, when the semiconductor device is a pressure sensor, pressure leakage does not occur.

Preferably, the second adhesive has the second Young's modulus of less than $4 \times 10^7$ Pa so that the second adhesive does not adversely affect the temperature characteristics of the semiconductor chip. A silicone system gel may be used as the first adhesive, and one of a silicone system adhesive and an epoxy system adhesive may be used as the second adhesive to satisfy the relationships of the Young's moduli described above.

BRIEF DESCRIPTION OF THE DRAWINGS

Other objects and features of the present invention will become more readily apparent from a better understanding of the preferred embodiments described below with reference to the following drawings.

DETAILED DESCRIPTION OF THE PREFERRED EMBODIMENTS

Figure 2:
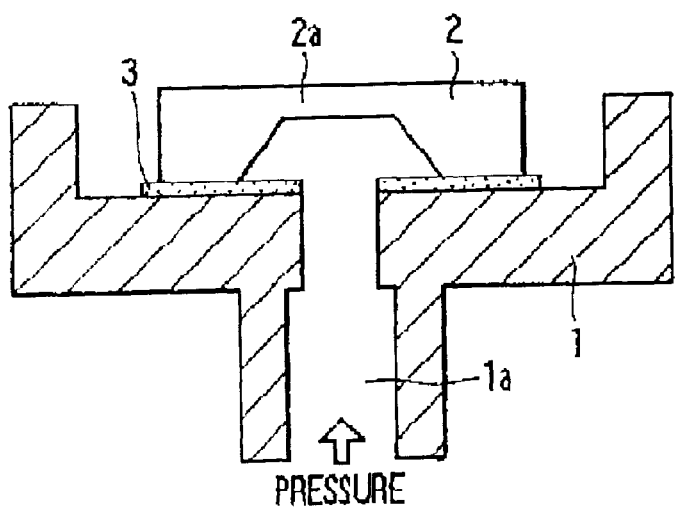
FIG. 2 is a cross-sectional view schematically showing a semiconductor pressure sensor used in experiments by the inventors.
Figure 3:
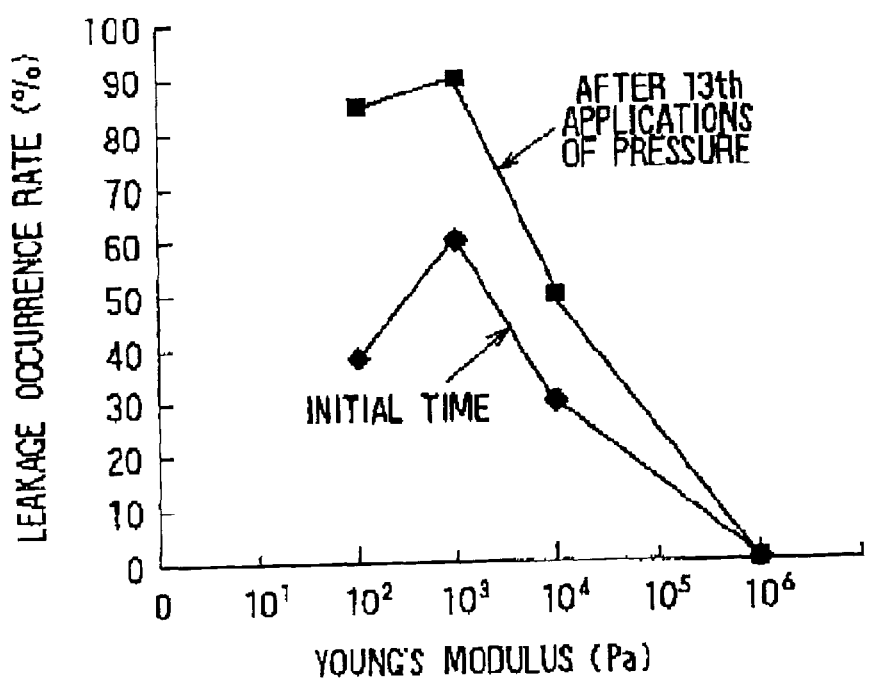
FIG. 3 is a graph showing relationships between Young's moduli of adhesive and leakage occurrence rates.
Figure 4:
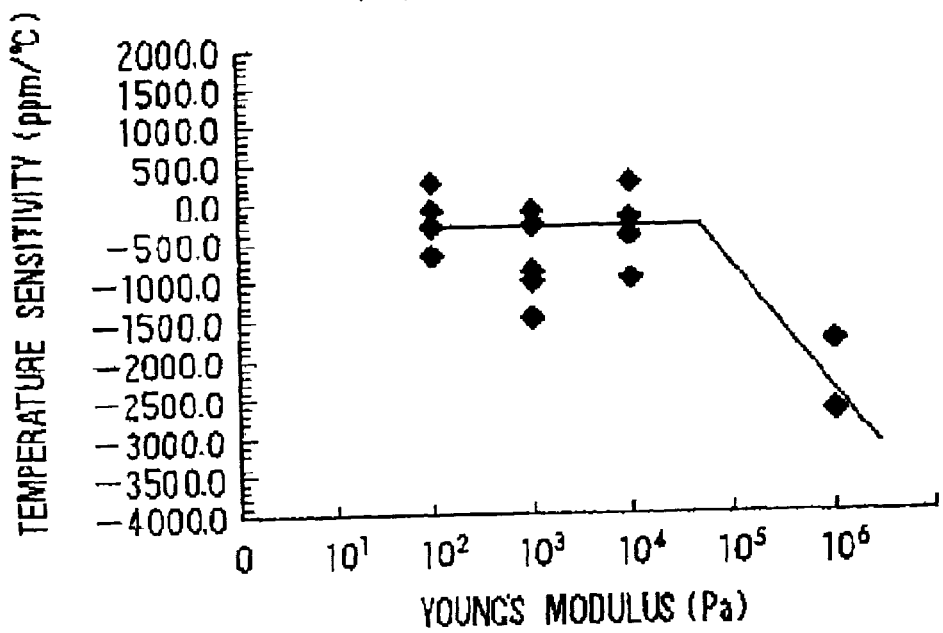
FIG. 4 is a graph showing a relationship between Young's moduli of adhesive and temperature sensitivities.

The inventors of the present invention approached the subject described above from a view of a Young's modulus of adhesive, and examined a semiconductor pressure sensor shown in FIG. 2 to obtain a relationship between Young's moduli of the adhesive and pressure leakage occurrence rates, and a relationship between the Young's moduli of the adhesive and temperature sensitivities. The results are shown in FIGS. 3 and 4. In FIG. 2, a sensor chip 2 having a diaphragm 2a is fixed to a casing 1 through adhesive 3. The casing 1 has a pressure introduction hole 1a. When measuring the pressure leakage occurrence rates, a pressure of pressure measurement medium that is introduced from the pressure introduction hole 1a was set at 350 mmH$_2$O.

From the results shown in FIG. 3, it is confirmed that the presence leakage does not occur when the Young's modulus of the adhesive 3 is equal to or larger than $1 \times 10^6$ Pa. From the results shown in FIG. 4, it is confirmed that the temperature property is stable when the Young's modulus is equal to or smaller than $1 \times 10^4$ Pa. According to these results, the inventors had an idea such that the sensor chip temperature characteristics may be improved without causing pressure leakage by utilizing two kinds of adhesives having different Young's moduli. Then, this idea is realized in a semiconductor pressure sensor shown in FIG. 1 as a preferred embodiment of the present invention.

Figure 1:
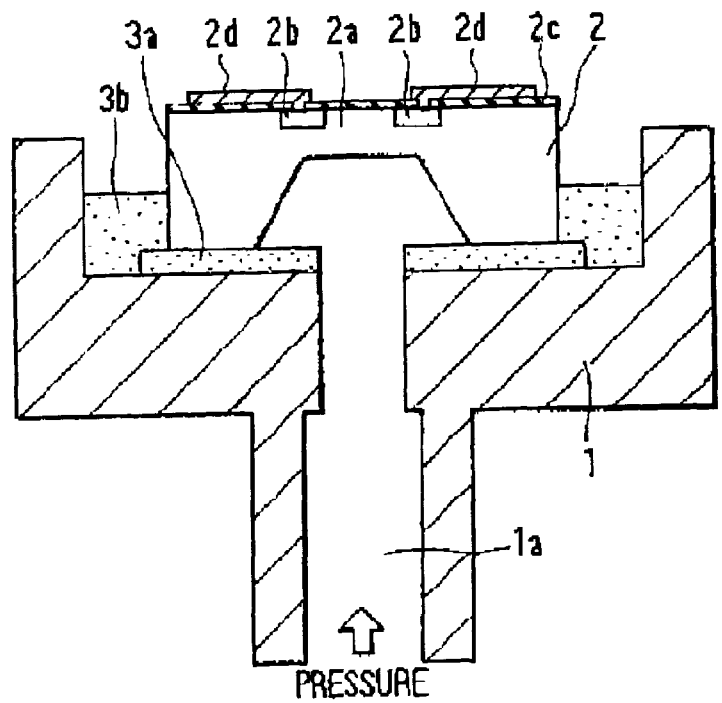
FIG. 1 is a cross-sectional view showing a semiconductor pressure sensor in a preferred embodiment of the present invention.

Referring to FIG. 1, the semiconductor pressure sensor has a sensor chip 2 that is fixed within a metallic casing 1 as a package. The casing 1 has a pressure introduction hole 1a for introducing pressure measurement medium toward the sensor chip 2. The pressure measurement medium is, for instance, air or nitrogen, which does not have corrosiveness. A lid, which is not shown, is attached to the casing 1 by adhesive after the sensor chip 2 and the like are attached.

The sensor chip 2 is composed of a silicon substrate, and has a diaphragm 2a that is displaced by pressure of the pressure measurement medium, piezoreisitance elements 2a having values of resistance that vary in response to displacement of the diaphragm 2a, an oxide film 2c formed on the surface of the substrate, and aluminum wiring segments 2d for the piezoresistance elements 2b. The aluminum wiring segments 2d are electrically connected to an external circuit via wires that are not shown.

The sensor chip 2 is fixed to the bottom face inside the casing 1 by adhesive 3a having a Young's modulus equal to or less than approximately $1\times10^4$ Pa. Silicone system (based) gel has a Young's modulus of approximately $1\times10^3$ Pa and can be used as the adhesive 3a. The low Young's modulus adhesive 3a absorbs stress produced due to a difference in thermal expansion coefficient between the sensor chip 2 and the casing 1, thereby improving temperature characteristics of the sensor chip 2.

Further, a space between the side wall of the sensor chip 2 and the inside walls of the casing 1 is filled with adhesive 3b having a Young's modulus equal to or larger than approximately $1\times10^6$ Pa. The adhesive 3b can be composed of silicone system (based) adhesive having a Young's modulus of approximately $1\times10^6$ Pa or epoxy system (based) adhesive having a Young's modulus of approximately $1.1\times10^6$ Pa. The high Young's modulus adhesive 3b prevents pressure leakage.

Other adhesives may be used as the adhesives 3a, 3b, provided that the relationships of the Young's moduli described above are satisfied. For instance, epoxy system gel may be used as the adhesive 3a in place of the silicone system gel. When the lid is attached to the upper portion of the casing 1 by the adhesive (specifically, by low melting point glass), it is preferable to use the silicone system gel, since the epoxy system gel adversely affects the adhesive for fixing the lid.

According to the present embodiment, the base of the sensor chip 2 having an area that is several times (for instance, three times) larger than that of the side walls of the sensor chip 2 is bonded to the casing 1 through the low Young's modulus adhesive 3a. Further, the space between the side walls of the sensor chip 2 and the inside walls of the casting 1 is filled with the high Young's modulus adhesive 3b. Consequently, thermal stress applied to the sensor chip 2 is reduced due to the low Young's modulus adhesive 3a, thereby improving the temperature characteristics of the sensor chip 2. Further, a sealing property between the sensor chip 2 and the casing 1 is secured by the high Young's modulus adhesive 3b, thereby preventing pressure leakage without adversely affecting the temperature characteristics.

Figure 5:
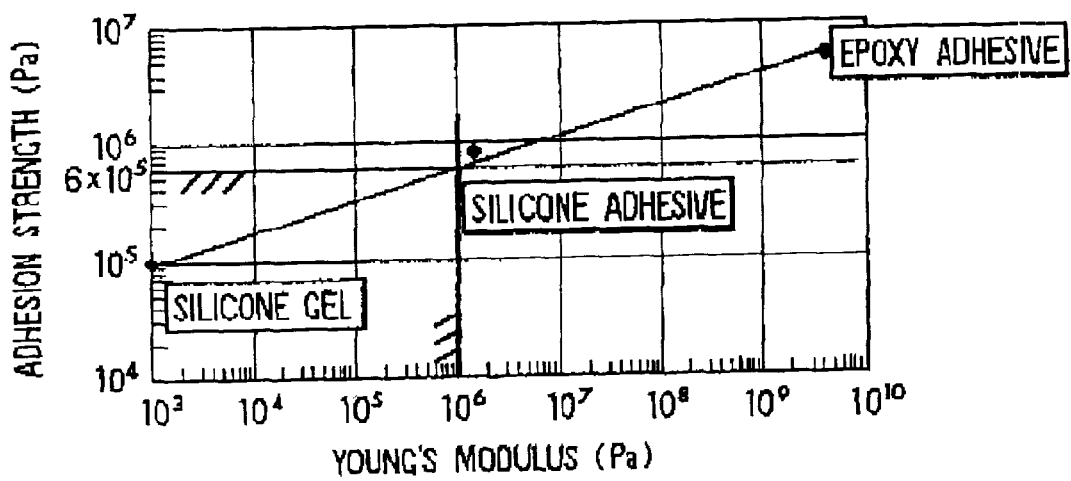
FIG. 5 is a graph showing a relationship between Young's moduli of adhesive and adhesion strengths.

Herebelow, the effects described above will be explained in more detail. First, a relationship between the Young's moduli and adhesion strengths of adhesive will be explained referring to FIG. 5. As shown in FIG. 5, the larger the Young's modulus of the adhesive becomes, the larger the adhesion strength becomes. When the Young's modulus is approximately $1\times10^6$ Pa, the adhesion strength is approximately $6\times10^3$ Pa. Accordingly, it is confirmed that the adhesive 3b having the Young's modulus of equal to or larger than $1\times10^6$ Pa has adhesion strength of equal to or larger than $6\times10^5$ Pa. That is, in the present invention, the sealing property between the sensor chip 2 and the casing 1 is improved by the adhesive 3b having the adhesion strength of equal to or larger than $6\times10^5$ Pa.

Next, a reason why the high Young's modulus adhesive 3b does not adversely affect the temperature characteristics of the sensor chip 2 will be theoretically explained.

Figure 6:
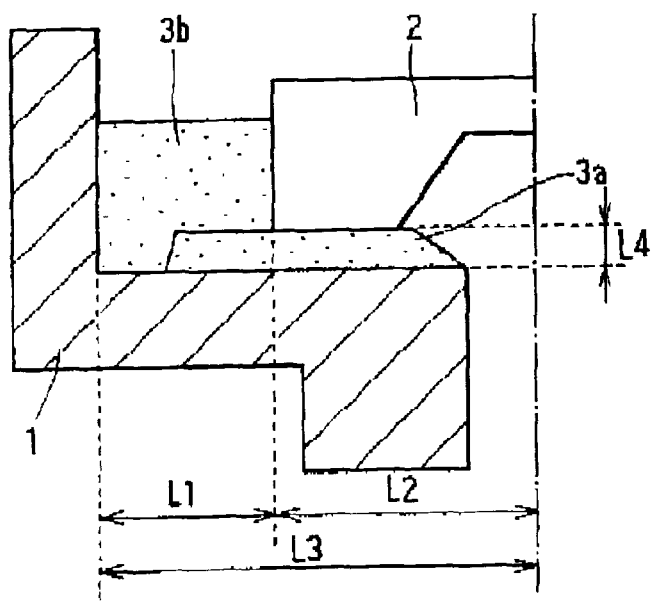
FIG. 6 is a cross-sectional view partially showing the semiconductor pressure sensor in the preferred embodiment.

Referring to FIG. 6, thermal stress Fa applied from the low Young's modulus adhesive 3a to the sensor chip 2 is represented by the following formula (1):

$$Fa\ (Ya \cdot Ha/L4) = (L2 \cdot \alpha_{cs} - L2 \cdot \alpha_{gi}) \cdot \Delta T \tag{1}$$

in which Ya is the Young's modulus of the adhesive 3a, Ha is a contact area of the adhesive 3a to the sensor chip 2, L4 is a thickness of the adhesive 3, L2 is a half width of the sensor chip 2, $\alpha_{ca}$ is a thermal expansion coefficient of the casing 1, $\alpha_{gi}$ is a thermal expansion coefficient of silicon constituting the sensor chip 2, and $\Delta T$ is a difference in temperature.

Further, thermal stress Fb applied from the high Young's modulus adhesive 3b to the sensor chip 2 is represented by the following formula (2);

$$Fb\ (Yb \cdot Hb/L1) \cdot (L3 \cdot \alpha_{cs} - T \cdot 2 \cdot \alpha_{si}) \cdot \Delta T \tag{2}$$

in which Hb is the Young's modulus of the adhesive 3b, Hb is a contact area of the adhesive 3b to the sensor chip 2, L1 is a gap between the sensor chip 2 and the casing 1, and L3 is a length between the inside wall of the casing 1 and the central point of the sensor chip 2, i.e., the sum of L1 and L2.

In the present embodiment, the Young's moduli of the adhesives 3a, 3b are determined so that the Young's modulus of the adhesive 3b becomes larger than that of the adhesive 3a and thermal stress Fb of the adhesive 3b becomes smaller than thermal stress Fb of the adhesive 3a. As a result, the adverse effect to the temperature characteristics by the high Young's modulus adhesive 3b can be negligibly reduced. Specifically, when thermal stress Fb is smaller than thermal stress Fa, the Young's moduli Ya. Yb of the adhesives 3a, 3b satisfies the following relationship (3):

$$Yb < Ya \cdot (Ha/Hb) \cdot (L1/L4) \cdot \{(L2 \cdot \alpha_{ca} - L2 \cdot \alpha_{s1})/(L3 \cdot \alpha_{ca} - L2 \cdot \alpha_{si})\} \tag{3}$$

For instance, when the Young's modulus of the adhesive 3a is approximately $1\times10^3$ Pa, contact area Hb of the adhesive 3b to the sensor chip 2 is approximately 0.6 mm$^2$, contact area Ha of the adhesive 3a to the sensor chip 2 is approximately 5 mm$^2$, length L1 is 1000 μm, length L4 is 5 μm, length L2 is 1.5 mm, and length L3 is 2.5 mm, the Young's modulus of the adhesive 3b satisfying the relationship (3) is less than $4\times10^7$ Pa. Incidentally, thermal expansion coefficient $\alpha_{ci}$ of silicon is set at 3.2 ppm/° C., and thermal expansion coefficient $\alpha_{cs}$ of the casing 1 is set at 20 ppm/° C., which is the value when the casing 1 is made of brass. That is, in the conditions described above, when the Young's modulus of the adhesive 3b is in a range of $1\times10^6$ Pa to $4\times10^7$ Pa, the adhesive 3b provides sufficient sealing property of the pressure sensor with small thermal stress negligibly applied to the sensor chip 2.

Figure 7:
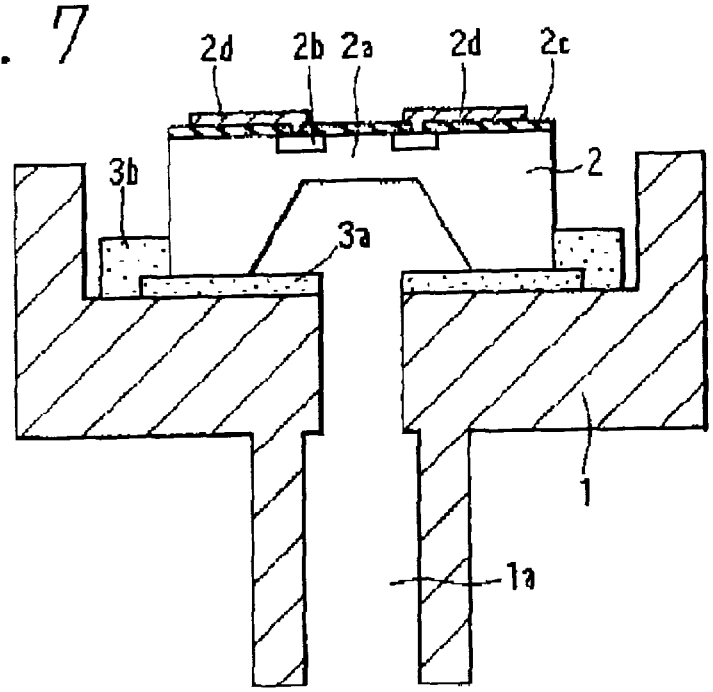
FIG. 7 is a cross-sectional view showing a semiconductor pressure sensor in a modified embodiment of the present invention.
Figure 8:
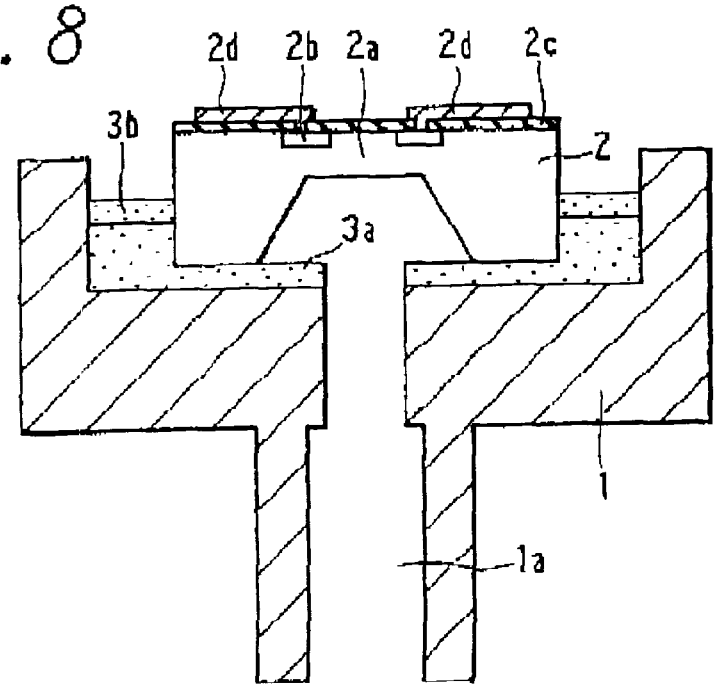
FIG. 8 is a cross-sectional view showing a semiconductor pressure sensor in another modified embodiment of the present invention.

In the present embodiment, the constitution of the pressure sensor is not limited to that shown in FIG. 1, and may be modified, for instance, as shown in FIGS. 7 and 8. In FIG. 7, the high Young's modulus adhesive 3b makes a gap with the inside walls of the casing 1. In FIG. 8, the low Young's modulus adhesive 3a is disposed to contact not only the bottom of the sensor chip 2 but also the side walls of the sensor chip 2 and the inside walls of the casing 1, and the high Young's modulus adhesive 3b is disposed on the exposed surface of the low Young's modulus adhesive 3a in the space between the sensor chip 2 and the casing 1. The other features are the same as those described in the preferred embodiment.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor device comprising:
a package;
a semiconductor chip fixed to an inside bottom wall of the package and defining a specific space between a side wall thereof and a side wall of the package;
a first adhesive having a first Young's modulus equal to or less than $1 \times 10^4$ Pa and disposed between the semiconductor chip and the inside bottom wall of the package; and
a second adhesive having a second Young's modulus equal to or larger than $1 \times 10^4$ Pa and disposed in the space to contact the semiconductor chip and the package.

2. The semiconductor device of claim 1, wherein the first adhesive is a silicone system gel, and the second adhesive is one selected from a silicone system adhesive and an epoxy system adhesive.

3. The semiconductor device of claim 1, wherein:
the semiconductor chip is a pressure sensor chip; and
the package has a pressure introduction hole for introducing a pressure of a pressure measurement medium toward the pressure sensor chip.

4. The semiconductor device of claim 1, wherein the second Young's modulus of the second adhesive is less than $4 \times 10^2$ Pa.

5. A semiconductor device comprising:
a package;
a semiconductor chip fixed to an inside bottom wall of the package and defining a specific space between a side wall thereof and a side wall of the package;
a first adhesive having a first adhesion strength that is equal to or less than $1 \times 10^4$ Pa, and disposed between the semiconductor chip and the inside bottom wall of the package; and
a second adhesive disposed in the space to contact the first adhesive, the semiconductor chip, and the package and having a second adhesion strength that is equal to or larger than $6 \times 10^5$ Pa.

6. The semiconductor device of claim 5, wherein the first adhesive is a silicone system gel, and the second adhesive is one selected from a silicone system adhesive and an epoxy system adhesive.

7. A semiconductor device comprising:
a package;
a semiconductor chip fixed to an inside bottom wall of the package and defining a specific space between a side wall thereof and a side wall of the package;
a first adhesive disposed between the semiconductor chip and the inside bottom wall of the package and having a first Young's modulus Ya that is equal to or less than $1 \times 10^4$ Pa; and
a second adhesive disposed in the space to contact the semiconductor chip and the package, and having a second Young's modulus Yb that is larger than the first Young's modulus Ya, wherein the first and second Young's moduli Ya and Yb satisfy a relationship of:

$$Yb < Ya \cdot (Ha/Hb) \cdot (L1/L4) \cdot \{(L2 \cdot \alpha_{ca} - L2 \cdot \alpha_{si})/(L3 \cdot \alpha_{ca} - L2 \cdot \alpha_{si})\},$$

wherein:

Ha and Hb are contact areas of the first and second adhesives to the semiconductor chip;
L1 is a length between the side wall of the semiconductor chip and the side wall of the package;
L2 is a half width of the sensor chip in a direction parallel to the inside bottom wall of the package;
L3 is a sum of L1 and L2;
L4 is a thickness of the first adhesive in a direction perpendicular to the inside bottom wall of the package;
$\alpha_{ca}$ is a thermal expansion coefficient of the package; and
$\alpha_{si}$ is a thermal expansion coefficient of the semiconductor chip.

8. The semiconductor device of claim 7, wherein the second Young's modulus of the second adhesive is in a range of $1 \times 10^6$ Pa to $4 \times 10^7$ Pa.

9. A semiconductor device comprising:
a package;
a semiconductor chip fixed to an inside wall of the package;
a first adhesive disposed between the sensor chip and the package with a first contact area contacting the sensor chip, the first adhesive having a first Young's modulus that is equal to or less than $1 \times 10^4$ Pa; and
a second adhesive disposed between the sensor chip and the package with a second contact area contacting the sensor chip and a second Young's modulus, wherein
the first contact area is larger than the second contact area; and
the first Young's modulus is smaller than the second Young's modulus.

10. The semiconductor device of claim 9, wherein the second Young's modulus of the second adhesive is in a range of $1 \times 10^6$ Pa and $4 \times 10^7$ Pa.

11. The semiconductor device of claim 9, wherein:
the first adhesive entirely contacts a bottom wall of the sensor chip; and
the second adhesive partially contacts a side wall of the sensor chip.

12. The semiconductor device of claim 1, wherein the inside bottom wall of the package has an introduction hole for introducing a measurement medium toward the semiconductor chip.

13. The semiconductor device of claim 12, wherein the first adhesive is exposed to the introduction hole.

14. The semiconductor device of claim 5, wherein the inside bottom wall of the package has an introduction hole for introducing a measurement medium toward the semiconductor chip.

15. The semiconductor device of claim 14, wherein the first adhesive is exposed to the introduction hole.

16. The semiconductor device of claim 7, wherein the inside bottom wall of the package has an introduction hole for introducing a measurement medium toward the semiconductor chip.

17. The semiconductor device of claim 16, wherein the first adhesive is exposed to the introduction hole.

18. The semiconductor device of claim 11, wherein:
the inside wall of the package has an introduction hole for introducing a measurement medium toward the semiconductor chip; and
the first adhesive is exposed to the introduction hole.

* * * * *